United States Patent
Xu

(10) Patent No.: US 9,264,753 B2
(45) Date of Patent: Feb. 16, 2016

(54) METHOD AND APPARATUS FOR INTERACTIVE CONTROL OF MEDIA PLAYERS

(75) Inventor: Yanbing Xu, Nashua, NH (US)

(73) Assignee: BROADCOM CORPORATION, Irvine, CA (US)

( * ) Notice: Subject to any disclaimer, the term of this patent is extended or adjusted under 35 U.S.C. 154(b) by 0 days.

(21) Appl. No.: 12/852,931

(22) Filed: Aug. 9, 2010

(65) Prior Publication Data

US 2012/0033140 A1    Feb. 9, 2012

Related U.S. Application Data

(60) Provisional application No. 61/370,337, filed on Aug. 3, 2010.

(51) Int. Cl.
| | |
|---|---|
| H04N 5/44 | (2011.01) |
| G05B 11/01 | (2006.01) |
| G09B 21/00 | (2006.01) |
| G09G 5/08 | (2006.01) |
| H04N 21/422 | (2011.01) |
| G08C 17/00 | (2006.01) |
| G06F 3/0481 | (2013.01) |
| H04N 21/436 | (2011.01) |

(52) U.S. Cl.
CPC ........ *H04N 21/42224* (2013.01); *G06F 3/0481* (2013.01); *G08C 17/00* (2013.01); *H04N 21/43615* (2013.01); *G08C 2201/21* (2013.01)

(58) Field of Classification Search
CPC .. G05B 15/02; H04L 12/2805; H04L 12/282; G08B 21/02; G08B 21/0423; G08B 13/196; G08B 25/08; H04N 21/42224; H04N 21/43615; H01L 21/68757; H01L 21/67103; G03F 7/7095; G03F 7/70858; G06F 3/0481; G06F 3/1454; G06F 1/1616; G06F 1/162; G09G 5/14; G09G 5/346; G08C 2201/42; G08C 2201/50; G08C 17/02; G08C 2201/33; F01K 21/047; F02G 5/00
USPC ........... 340/825.69, 825.72, 310.01, 3.1, 538, 340/531, 447, 310.08, 500, 539.14, 550, 340/545.2, 539.1, 12.22, 12.54, 12.39, 340/12.52, 13.3; 341/176, 20, 21, 22, 157, 341/168; 700/90, 221, 219, 224, 296, 297, 700/291, 306; 715/744, 751, 781, 808, 866; 348/734; 345/157
See application file for complete search history.

(56) References Cited

U.S. PATENT DOCUMENTS 6,127,941 A  * 10/2000 Van Ryzin .................... 340/4.37
6,538,556 B1 * 3/2003 Kawajiri ........................ 340/3.2
(Continued)

*Primary Examiner* — Mirza Alam
(74) *Attorney, Agent, or Firm* — Foley & Lardner LLP; Christopher J. McKenna; Daniel E. Rose

(57) ABSTRACT

A method and system are provided in which a wireless controller, such as a smart remote controller or smartphone, for example, may interact with a media device through an adaptive, two-way feedback control scheme. The wireless controller may receive signals from a media player that comprise control information associated with an application on the media player. The wireless controller may then display a control page or user interface on a touch screen. A layout of the control page may be configured based on the control information received by the wireless controller. Once displayed, the control page may enable a user to provide one or more instructions to the wireless controller through the touch screen. The wireless controller may communicate to the media player the instructions provided to the wireless controller. Those instructions are communicated to the media player to control the operation of the application on the media player.

20 Claims, 8 Drawing Sheets

(56) References Cited

U.S. PATENT DOCUMENTS

| | | | |
|---|---|---|---|
| 6,906,617 B1 * | 6/2005 | Van der Meulen | 340/538 |
| 7,136,709 B2 * | 11/2006 | Arling et al. | 700/65 |
| 7,155,305 B2 * | 12/2006 | Hayes et al. | 700/224 |
| 2005/0096753 A1 * | 5/2005 | Arling et al. | 700/11 |
| 2005/0235214 A1 * | 10/2005 | Shimizu et al. | 715/740 |
| 2008/0174449 A1 * | 7/2008 | Schmidt et al. | 340/825.22 |
| 2010/0238046 A1 * | 9/2010 | Lee et al. | 340/825.36 |

* cited by examiner

METHOD AND APPARATUS FOR INTERACTIVE CONTROL OF MEDIA PLAYERS

CROSS-REFERENCE TO RELATED APPLICATIONS/INCORPORATION BY REFERENCE

This application claims priority to and makes reference to U.S. Provisional Patent Application Ser. No. 61/370,337 filed on Aug. 3, 2010.

The above stated application is hereby incorporated herein by reference in its entirety.

FIELD OF THE INVENTION

Certain embodiments of the invention relate to remote controllers. More specifically, certain embodiments of the invention relate to a method and apparatus for interactive control of media players.

BACKGROUND OF THE INVENTION

A remote controller for use with a media device, such as those used with digital televisions (DTVs), set-top-boxes, digital video/versatile disc (DVD) players, and Blu-ray disc players, for example, typically communicates with the media device by sending one-way commands. The instructions or commands are sent in response to a user pressing one or more of the keys in the remote controller. As the applications, operations, and/or control functions supported by the media devices become more complex, an ever increasing number of keys may be needed in the remote controller to allow a user to navigate, operate, and/or control the media players.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

An apparatus and/or method for interactive control of media players, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Figure 1:
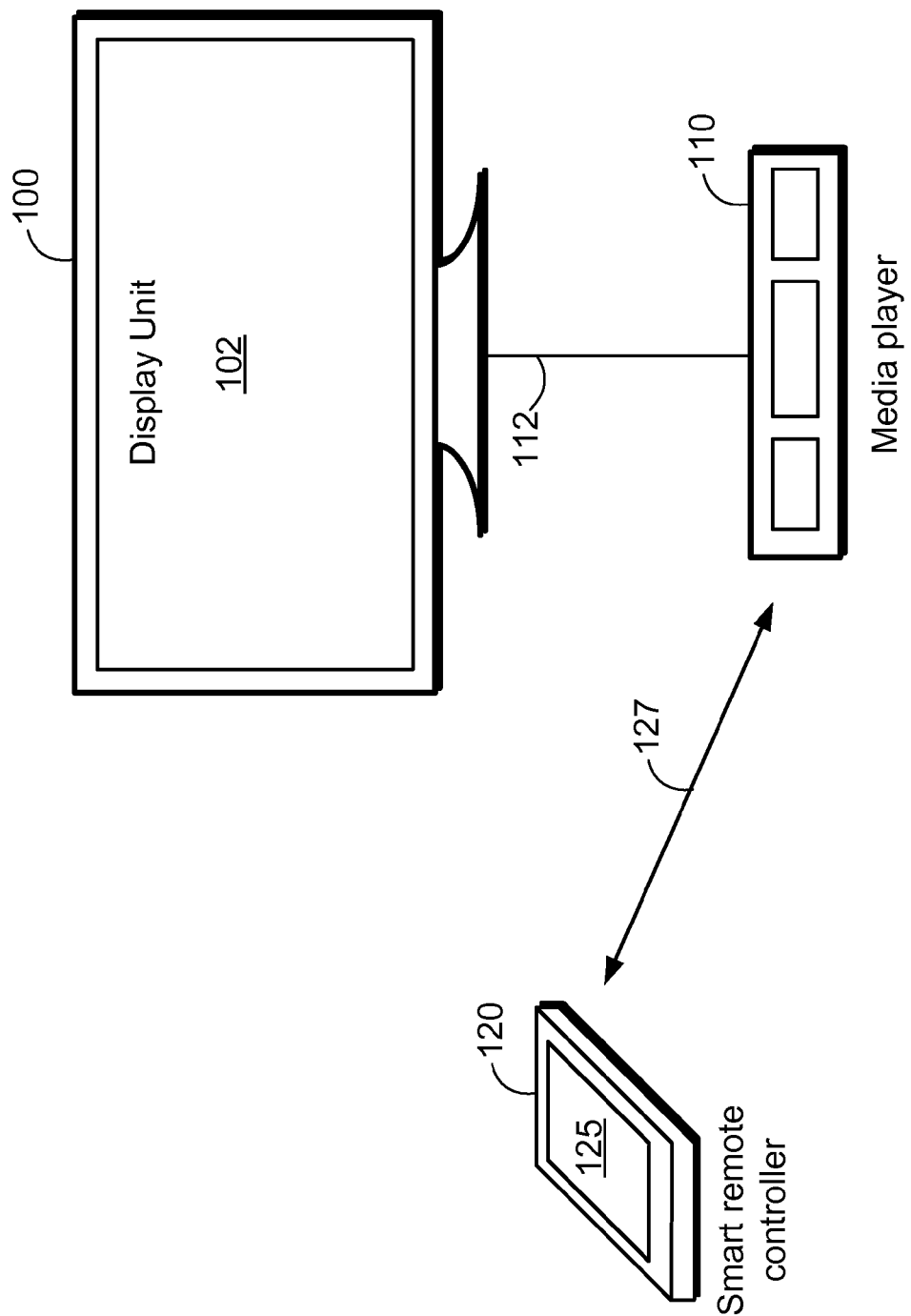
FIG. 1 is a block diagram illustrating an exemplary interaction between a smart remote controller and a media player, in accordance with an embodiment of the invention.

Certain embodiments of the invention can be found in a method and apparatus for interactive control of media players. Various embodiments of the invention provide for a wireless controller, such as a smart remote controller or smartphone, for example, that interacts with a media device or media player through an adaptive, two-way feedback control scheme. This interaction allows the wireless controller to dynamically adjust or change according to the operation of the media player. The wireless controller may receive one or more signals from a media player. The signals received may comprise control information associated with an application on the media player. The wireless controller may then display a control page on a touch screen. A layout of the control page may be configured based on the control information received by the wireless controller. Once displayed, the control page may enable a user to provide one or more instructions to the wireless controller through the touch screen. For example, the control page may provide a graphical user interface that indicates to a user the various functions and/or operations of the media player application that may be remotely controlled. Once an instruction or command is provided by a user, the wireless controller may communicate that instruction or command to the media player to control the operation of the application on the media player. The communication between the wireless controller and the media player may be performed through a determined communication protocol supported by both.

While a smart remote controller may utilize a two-way feedback control scheme to control the operation of a media player, a typical remote controller sends one-way commands to the media player that is being controlled. The behavior and/or capabilities of the typical remote controller may not be adjusted based on the applications and/or the operating status of the controlled media player. Next generation media players may be capable of supporting more complex and sophisticated applications that may include advanced handling of multimedia information comprising pictures, music, audio, and/or video. Such applications may support search capabilities and even Internet navigation. A typical remote controller will not be able to adapt to the different applications that may be supported by a media player. Moreover, a typical remote controller will not be able to dynamically adjust to the changing status of such applications.

The keys, or buttons, of a remote controller are pressed or selected by a user to indicate the instruction, command, or operation that the user wants performed next in connection with the operation of an application on the media player. Different applications operating on a media player may need different sets of keys on the remote controller. In addition, any one application may need a different set of keys based on the operating stage or status of the application.

A smart remote controller in accordance with aspects of the present invention may be able to dynamically change the set of keys that are presented to a user on a touch screen based on the current application running on the media player and/or the current status of that application. For example, when the media player is being utilized to play a movie, a smart remote controller may present a user with a typical set of playback control keys, such as PAUSE, PLAY, FAST FORWARD, FAST REWIND, SKIP NEXT, and SKIP PREVIOUS. However, when the media player is being utilized to input web addresses or search words for browsing or searching information on Internet, for example, the smart remote controller may present a user with a virtual keyboard for easily providing long strings of text. By presenting the user with just the right set of keys needed to control a current application in its current operating stage or status, the smart remote controller need not have all possible keys available to a user all the time.

When presenting a particular set of keys to a user, the smart remote controller may be able to dynamically change which of the keys are active based on changes in the operating status of an application on the media player. An active key may be distinguished from an inactive key by changing the visual features of the key. For example, the active version of the key may have a different look, such as a different color, highlight, border, shading, or the like. In other words, the image that is rendered for a particular key may change based on whether the operation or function associated with that key is currently needed to control the media player. For example, the media player, such as a Blu-ray disc player, may support the use picture-in-picture (PIP), secondary audio, and secondary subtitles. The smart remote controller may present a user, as part of a set of Blu-ray disc play control keys, a PIP key, a SECONDARY AUDIO key, and a SECONDARY SUBTITLE key. These keys are made active when a secondary video stream is available and inactive when the secondary video stream is not available. In this regard, the media player may send messages to the smart remote controller indicating any status update or change based on the running or operating status of a media player application. The smart remote controller may then change the active status of one or more keys according to the updates received.

In a typical remote controller, very often users are required to press existing keys repeatedly or in some combination to accomplish a new task. For example, when a user wants to input a web address or search words in a media player, a virtual keyboard may be displayed on the television and the user may press the arrow keys in the remote controller to move a cursor to the appropriate character on the virtual keyboard being displayed and then press another key, for example an ENTER key, to select the desired character. Such an approach is cumbersome and/or time consuming for the user. The smart remote controller may instead display a virtual keyboard on a touch screen to allow the user to select a character by simply pressing that character's key on the touch screen. While remote keyboards and/or mouse devices may be utilized to address some of the issues described above, these devices tend to be big and not easy to use.

FIG. 1 is a block diagram illustrating an exemplary interaction between a smart remote controller and a media player, in accordance with embodiments of the invention. Referring to FIG. 1, there is shown a display unit 100, a media player 110, and a smart remote controller 120.

The display unit 100 may comprise suitable logic, circuitry, code, and/or interfaces that may be operable to receive video signals from the media player 110. In this regard, the display unit 100 may be operable to process the video image data and/or the audio data comprised within such video signals. The display unit 100 may comprise a visual display or screen 102 that may be operable to display the video images associated with the video image data processed by the display unit 100. The screen 102 may be based on a display technology such as cathode ray tubes (CRTs), liquid crystal displays (LCDs), plasma display panels (PDPs), thin film transistor LCDs (TFT-LCDs), plasma, light emitting diode (LED), Organic LED (OLED), or other flatscreen display technology, for example. The screen 102 may support one or more aspect ratios when displaying video images such as a 4:3 standard aspect ratio and a 16:9 widescreen aspect ratio, for example. The display unit 100 may also comprise one or more speakers (not shown) that may be operable to reproduce the sound associated with the audio data processed by the display unit 100.

While the display unit 100 may typically be a television, the invention need not be so limited. For example, the display unit 100 may be a monitor, a handheld device, a portable device, a stationary device, or other like device that is capable of receiving video signals from the media player 110, and processing and/or handling the video content associated with the received video signals. When the display unit 100 is a television, the display unit 100 may support multiple technical standards such as digital television (DTV) and high-definition television (HDTV), for example.

The media player 110 may comprise suitable logic, circuitry, code, and/or interfaces that may be operable to generate one or more video signals that may be communicated to the display unit 100 via a link 112. The link 112 may comprise, for example, suitable connectors, coaxial cables, wires, and/or optical fibers that enable wired communication to and/or from the media player 110. In an embodiment of the invention, at least a portion of the link 112 may comprise a wireless communication link.

The media player 110 may be, for example, a set-top-box or a digital video recorder (DVR), or a combination thereof. When the media player 110 is a set-top-box, the media player 110 may be operable to receive signals from a cable or satellite operator that provides television services and/or other type of programming services. The media player 110 may be operable to process the signals received from the operator and, based on the processed signals, generate the video signals that may be communicated to the display unit 100. When the media player 110 is a DVR or other like device, the media player 110 may be operable to digitally record and/or play back video content. For example, the media player 110 may digitally record and/or play back video image data and/or audio data. The media player 110 may support recording and/or playback operations in one or more formats that may include, but need not be limited to, a compact disc (CD) format, a DVD format, and a Blu-ray Disc (BD) format, for example. The media player 110 may utilize a memory medium, such as a disk drive, a universal serial bus (USB) flash drive, a non-volatile memory card (e.g., secure digital (SD) memory card), and/or other type of digital storage medium in which to digitally record and/or from which to play back video image data and/or audio data. In some embodiments of the invention, the media player 110 may be a portable device or an application for a personal computer that enables capturing, storing, and/or playing back video image data and/or audio data. In an embodiment of the invention, some or all of the functions or operations supported by the media player 110 may be implemented in the display unit 100.

The smart remote controller 120 may comprise suitable logic, circuitry, code, and/or interfaces that may be operable to wirelessly control at least a portion of the operations of the media player 110. In this regard, the smart remote controller 120 may be operable to control the operation of one or more applications supported by the media player 110. The smart remote controller 120 may interact with the media player 110 through an adaptive, two-way feedback control scheme. This interaction allows the smart remote controller 120 to dynamically adjust or change a control page or graphical interface presented to a user in a touch screen 125 for controlling the operation of the media player 110. The smart remote controller 120 and the media player 110 may interact via a wireless link 127, such as a Bluetooth, a WiFi, or another bi-directional wireless connection, for example. The smart remote controller 120 may be operable to receive control information, such as control page messages and/or status updates, through one or more signals received from the media player 110. The smart remote controller 120 may be operable to send commands or instructions, such as control key press messages, to the media player 110 through one or more signals generated by the smart remote controller 120.

In operation, the smart remote controller 120 may receive messages from the media player 110 and may send commands or instructions to the media player 110. By utilizing a feedback control loop between the smart remote controller 120 and the media player 110, the media player 110 may provide control information, such as control page messages and/or status updates, to the smart remote controller 120 to dynamically change the control page presented to a user on the touch screen 125. In this manner, when a particular application is running on the media player 110 and that particular application is operating at a certain status or stage, the smart remote controller 120 may present to a user an appropriate set of keys, text block, and/or touch pads on the touch screen 125 that may allow the user to navigate, operate, and/or control the media player 110.

Figure 2:
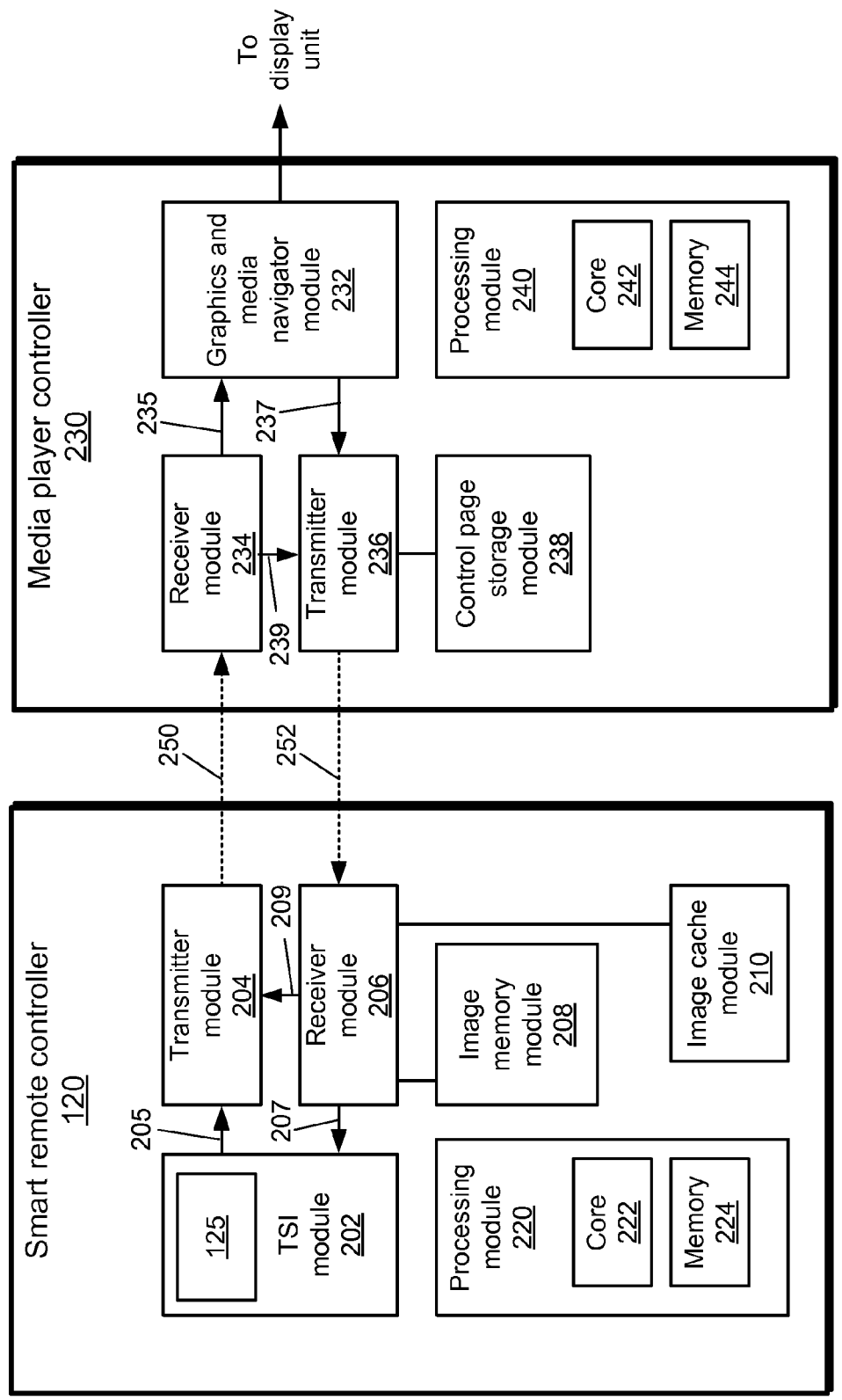
FIG. 2 is a block diagram illustrating exemplary smart remote controller and media player architectures, in accordance with an embodiment of the invention.

FIG. 2 is a block diagram illustrating exemplary smart remote controller and media player architectures, in accordance with an embodiment of the invention. Referring to FIG. 2, there is shown the smart remote controller 120 of FIG. 1 in more detail. Also shown in FIG. 2 is a media player controller 230 that may be comprised within the media player 110 of FIG. 1, for example.

The smart remote controller 120 may comprise a touch screen interface (TSI) module 202, a transmitter module 204, a receiver module 206, an image memory module 208, and an image cache module 210. The smart remote controller 120 may also comprise a processing module 220 having a core 222 and a memory 224. The TSI module 202 may comprise suitable logic, circuitry, code, and/or interfaces that may be operable to render a control page for display on the touch screen 125. The control page is a graphical interface that enables a user to input instructions or commands to the smart remote controller 120 through the touch screen 125. While FIG. 2 shows the touch screen 125 as being part of the TSI module 202, the touch screen 125 may be separate from the TSI module 202. The control page that is rendered by the TSI module 202 may comprise the images of one or more keys, one or more text boxes, and/or one or more touch pads laid out in a particular arrangement. The layout of the various image components in the control page may be based on information stored in the smart remote controller 120 and/or on information received from the media player controller 230. Once displayed, the control page may enable a user to press a portion of the touch screen 125 on which the image of a certain key is displayed. The touch screen 125 may generate a signal indicating the position pressed by the user and the TSI module 202 may associate the signal with the appropriate key on the touch screen 125.

The receiver module 206 may comprise suitable logic, circuitry, code, and/or interface that may be operable to receive control information from the media player controller 230 through one or more signals received via a wireless link 252 (shown in dashed lines). In this regard, the receiver module 206 may be operable to support reception of signals over one or more wireless communication protocols such as Bluetooth and WiFi, for example. The control information received by the receiver module 206 may be in the form of control page messages generated by the media player controller 230. Accordingly, the receiver module 206 may also be referred to as a control page receiver, for example. The receiver module 206 may be operable to generate image information that may be communicated to the TSI module 202 via one or more signals 207. The image information may be generated based on the control information received. That is, the particular layout of the various images, for example soft keys, in the control page may be based on the control information received by the receiver module 206 from the media player controller 230. The image information may comprise information necessary to render images such as soft-keys, soft-keyboards, text boxes, and/or touch pads, for example.

The transmitter module 204 may comprise suitable logic, circuitry, code, and/or interfaces that may be operable to send instructions or commands to the media player controller 230 through one or more signals via a wireless link 250, which is shown in dashed lines. In this regard, the transmitter module 204 may be operable to support transmission of signals over one or more wireless communication protocols such as Bluetooth and WiFi, for example. The instructions or commands sent by the transmitter module 204 may be in the form of commands messages that may be utilized by the media player controller 230. Accordingly, the transmitter module 204 may also be referred to as a command transmitter, for example. The command messages may be based on keys presses, and/or on cursor movement vectors received by the transmitter module 204 from the TSI module 202 via one or more signals 205. The command messages may also comprise device identification (ID) information and/or capacity information associated with the smart remote controller. The ID information and capacity information may be included in a command message in response to a request from the receiver module 206 received by the transmitter module 204 via one or more signals 209.

The image memory module 208 may comprise suitable logic, circuitry, code, and/or interfaces that may be operable to store information that may be utilized by the TSI module 202 to generate the control page that is displayed on the touch screen 125. In this regard, the information stored in the image memory module 208 may comprise information such as key image information, virtual keyboard image information, and/or touch pad image information, for example. The information stored may also comprise information regarding active and inactive versions of a key. The information stored in the image memory module 208 may be utilized by the receiver module 206 to generate the image information that may be communicated to the TSI module 202 for rendering and displaying the control page.

The image cache module 210 may comprise suitable logic, circuitry, code, and/or interfaces that may be operable to store recently retrieved or utilized image information such that the receiver module 206 may have local access to the image information and may more readily access such information.

In this manner, time and bandwidth may be reduced when retrieving information by the receiver module 206 to generate the image information that is to be sent to the TSI module 202 for rendering and displaying the control page.

The processing module 220 may comprise suitable logic, circuitry, code, and/or interfaces that may be operable to control the operations of the smart remote controller 120. The core 222 may be operable to perform control operations and/or various calculations or computations that may be associated with the adaptive, two-way feedback control interaction between the smart remote controller 120 and a media player comprising the media player controller 230. The memory 224 may be operable to store information associated with control operations and/or calculations performed by the smart remote controller 120. In some instances, the memory 224 in the processing module 220 may comprise one or both of the image memory module 208 and the image cache module 210.

The media player controller 230 may comprise a graphics and media navigator (GMN) module 232, a transmitter module 236, a receiver module 234, and a control page storage module 238. The media player controller 230 may also comprise a processing module 240 having a core 242 and a memory 244. The GMN module 232 may comprise suitable logic, circuitry, code, and/or interfaces that may be operable to generate display and/or graphics information for a display unit, such as the display unit 100 described above with respect to FIG. 1. The GMN module 232 may be operable to change the display and/or graphics based on the instructions or commands received from the receiver module 234 through one or more signals 235.

The receiver module 234 may comprise suitable logic, circuitry, code, and/or interfaces that may be operable to receive command messages from the smart remote controller 120 through one or more signals sent via the wireless link 250. Accordingly, the receiver module 234 may also be referred to as a command receiver, for example. The receiver module 234 may be operable to support reception of signals over one or more wireless communication protocols such as Bluetooth and WiFi, for example.

The command messages received may comprise ID information and capacity information associated with the smart remote controller 120. The receiver module 234 may also receive page retrieval messages from the smart remote controller 120. The receiver module 234 may be operable to decode and/or process the command messages to generate one or more corresponding navigation, operation, and/or control messages that may be communicated to the GMN module 232 via the one or more signals 235. The receiver module 234 may be operable to decode and/or process the ID information, capacity information, and/or page retrieval messages to generate one or more corresponding messages that may be communicated to the transmitter module 236 via one or more signals 239.

The transmitter module 236 may comprise suitable logic, circuitry, code, and/or interfaces that may be operable to generate and transmit control page messages comprising control information to the smart remote controller 120 through one or more signals sent via the wireless link 252. Accordingly, the transmitter module 236 may be referred to as a control page transmitter, for example. The transmitter module 236 may be operable to support transmission of signals over one or more wireless communication protocols such as Bluetooth and WiFi, for example. The transmitter module 236 may send control page messages that may comprise information regarding which keys, virtual keyboards, text boxes, and/or touch pads to present to a user in the smart remote controller 120 in view of a current application running or operating on the media player and the status of that application.

The control page storage module 238 may comprise suitable logic, circuitry, code, and/or interfaces that may be operable to store information for various images and/or for control pages to be utilized with different applications and control sessions. The transmitter module 236 may obtain the information stored in the control page storage module 238 based on a message or on the status of the message received by the transmitter module 236 from the GMN module 232 through one or more signals 237.

The processing module 240 may comprise suitable logic, circuitry, code, and/or interfaces that may be operable to control the operations of the media player controller 230. The processing module 240 need not be comprised within the media player controller 230 and may instead be located in another portion of the media player. The core 242 may be operable to perform control operations and/or various calculations or computations that may be associated with the adaptive, two-way feedback control interaction between the smart remote controller 120 and the media player controller 230. The memory 244 may be operable to store information associated with control operations and/or calculations performed by the media player controller 230. In some instances, the memory 244 in the processing module 240 may comprise the control page storage module 238.

Figure 3:
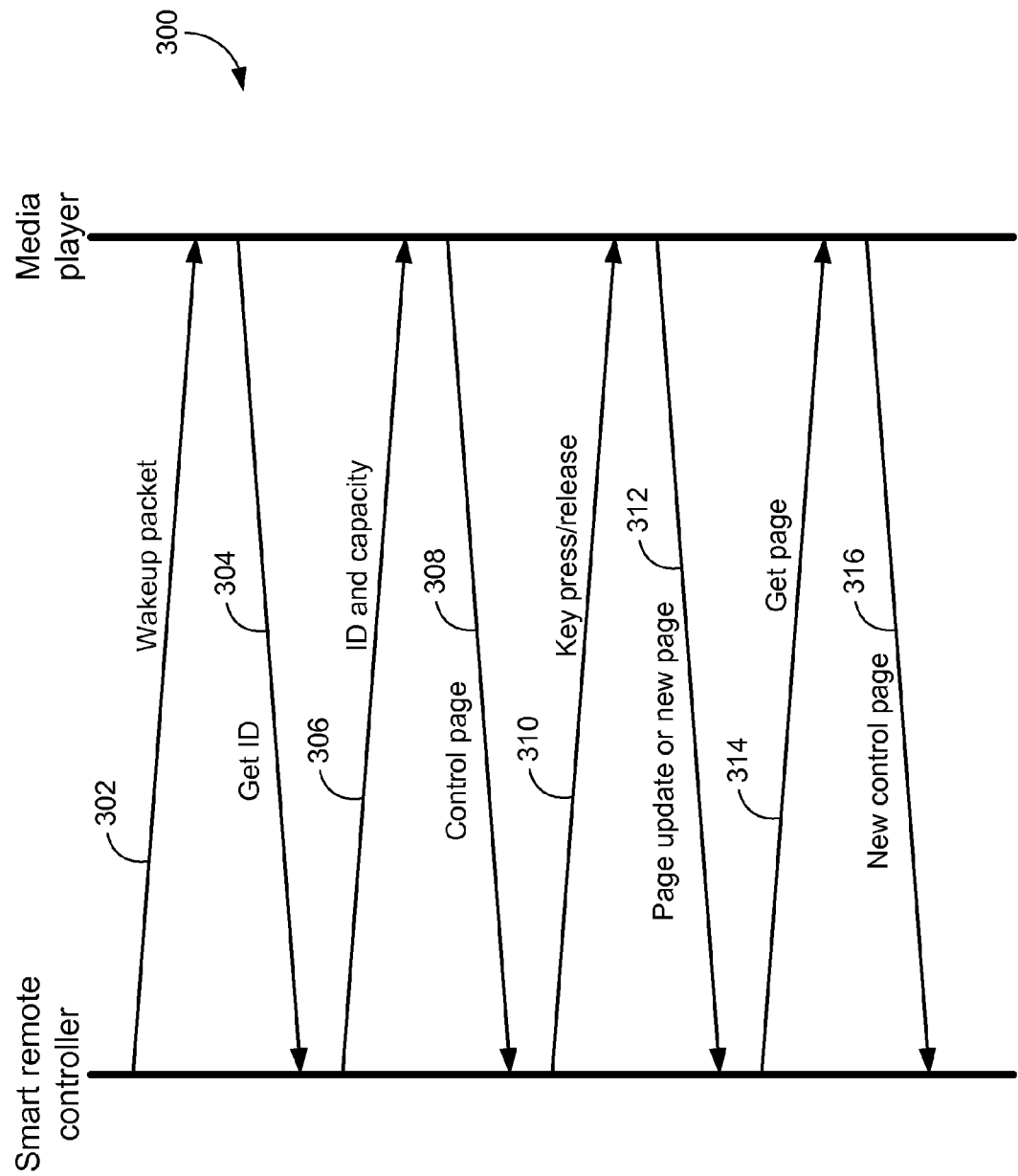
FIG. 3 is a diagram that illustrates a two-way communication protocol between a smart remote controller and a media player, in accordance with an embodiment of the invention.

FIG. 3 is a diagram that illustrates a two-way communication protocol between a smart remote controller and a media player, in accordance with an embodiment of the invention. Referring to FIG. 3, there is shown a two-way communication protocol 300 that may be utilized for an adaptive, two-way feedback control interaction between a smart remote controller, such as the smart remote controller 120, and a media player comprising a media player controller, such as the media player controller 230.

At step 302 of the communication protocol 300, when a user may activate a POWERON/STANDBY key that is presented to the user through a control page on the touch screen 125 of the smart remote controller 120, the TSI module 202 in the smart remote controller 120 may send information associated with the activated key to the transmitter module 204. The key may be activated by pressing or touching the touch screen 125, for example. The transmitter module 204 may compose a Bluetooth or WiFi wakeup packet and may communicate the wakeup packet to the receiver module 234 in the media player controller 230 via the wireless link 250.

While in a power saving or standby mode, the receiver module 234 in the media player controller 230 may monitor a portion of the packets received. For example, the receiver module 234 may only monitor for wakeup packets and may ignore any other packets received. When the receiver module 234 detects that a received packet is a wakeup packet and verifies that, for example, the media access control (MAC) address in the wakeup packet matches the MAC address associated with the media player in which the media player controller 230 resides, the receiver module 234 may generate and send an indication of the reception of a wakeup packet to the transmitter module 236 and/or to the GMN module 232.

At step 304 of the communication protocol 300, upon receiving the indication that a wakeup packet has been received, the transmitter module 236 may generate or compose a message to be sent to the smart remote controller 120 to obtain the device ID information and/or capacity information. Once composed, the message is sent by the transmitter module 236 to the receiver module 206 in the smart remote controller 120 via the wireless link 252.

The receiver module 206 may obtain the ID information and the capacity information for the smart remote controller 120 from, for example, the image memory module 208. The ID information and capacity information associated with the smart remote controller 120 may comprise a device ID that may be pre-programmed and stored in the image memory module 208 utilizing a public encryption key such that only a media player that has access to an appropriate private key may decode the device ID to verify whether the device, that is, the smart remote controller 120, is a valid device to control the media player. The ID information and capacity information associated with the smart remote controller 120 may comprise visible size (e.g., display area) information of the touch screen 125. The visible size information may comprise width pixel numbers, height pixel numbers, and/or coordinate information, for example. The ID information and capacity information associated with the smart remote controller 120 may comprise color depth and other color information for the graphics display capabilities of the touch screen 125, including the maximum number of bits to represent a pixel, such as 4 bits, 8 bits, 16 bits, or 32 bits, for example.

The ID information and capacity information associated with the smart remote controller 120 may comprise one or more Boolean bits to indicate whether the smart remote controller 120 supports relative layout of keys on the touch screen 125. For example, when a single Boolean bit is utilized, a true bit may indicate that the smart remote controller 120 may be operable to calculate or determine a position of each key in the control page based on the description of a group of keys for that control page. The smart remote controller 120 may carry out this calculation when no absolute position information for the various keys is provided by a control page message received from the media player controller 230.

The ID information and capacity information associated with the smart remote controller 120 may comprise one or more Boolean bits to indicate whether the touch screen 125, or a portion thereof, may be utilized as a touch pad to control a cursor position when a user moves a finger over the touch screen 125. The ID information and capacity information associated with the smart remote controller 120 may comprise one or more Boolean bits to indicate whether the touch screen 125 may be utilized to present a virtual keyboard to enable ASCII character input by a user. When a virtual keyboard is supported, the ID information and capacity information may comprise positioning information for the virtual keyboard, such as a starting position (e.g., x-y coordinates of starting position) and virtual keyboard size (e.g., width, height). The ID information and capacity information associated with the smart remote controller 120 may comprise one or more Boolean bits to indicate whether the virtual keyboard may be repositioned to a different starting point and/or scaled to a different size.

Once the receiver module 206 obtains the ID information and the capacity information for the smart remote controller 120 from the image memory module 208, the receiver module 206 may send the ID information and the capacity information to the transmitter module 204.

At step 306 of the communication protocol 300, the transmitter module 204 in the smart remote controller 120 may communicate the ID information and the capacity information to the receiver module 234 in the media player controller 230 via the wireless link 250. The receiver module 234 may verify that the device ID of the smart remote controller 120 is a valid or acceptable device ID to control, operate, and/or navigate the media player. The receiver module 234 may utilize a private key to decrypt the device ID when encrypted.

When the device ID is verified, the receiver module 234 may communicate capacity information to the transmitter module 236. The receiver module 234 may also indicate to the GMN module 232 that the device ID of the smart remote controller 120 is a valid ID and that the GMN module 232 may begin to run or execute a top media player application.

The transmitter module 236 may store ID information and/or capacity information in the control page storage module 238 such that the information may be available for later use. The transmitter module 236 may be operable to calculate templates for the different control pages that may be utilized with the various applications supported by the media player. In this regard, the transmitter module 236 may calculate the templates based on the capacity information of the smart remote controller 120. The templates may be stored in the control page storage module 238, for example. The GMN module 232 may send information associated with its top and first media player application and a control page ID to the transmitter module 236.

At step 308 of the communication protocol 300, the transmitter module 236 may identify a control page that corresponds to the application information and the control page ID received from the GMN module 232. The transmitter module 236 may compose a control page message comprising the appropriate control information and may communicate the control page message to the receiver module 206 in the smart remote controller 120 via the wireless link 252.

The receiver module 206 may receive the control page message and may detect or determine whether the control page message received is a new control page message based on the application information and control page ID. When the control page message is a new control page message, the receiver module 206 may send rendering control information to the TSI module 200. The rendering control information may indicate a configuration of the layout of the control page to be displayed on the touch screen 125. For example, the rendering control information may indicate which keys, keyboards, text boxes, and/or touch pads to render, where are they to be positioned on the touch screen 125, which of those elements are to be shown as active and which as inactive, and/or the graphical characteristics (e.g., color, size, shading, border) of the images to be utilized. The TSI module 200 may render the control page in accordance with the rendering control information. The rendered control page may be displayed on the touch screen 125 for user interaction.

A user may now see the displayed control page on the touch screen 125. When the user presses a location of the touch screen 125 that is associated with, for example, a particular key being displayed, the TSI module 202 may receive an indication of the pressing of that particular key from the touch screen 125 and may generate and send a key press signal to the transmitter module 204.

At step 310 of the communication protocol 300, the transmitter module 204 may generate or compose a command message comprising the instructions or commands received from the TSI module 202. In this instance, the transmitter module 204 may compose a key press/release message, for example, and may communicate that message to the receiver module 234 in the media player controller 230 via the wireless link 250. The receiver module 234 may pass the command message and a navigation event signal to the GMN module 232.

The GMN module 232 may process the navigation event signal and may generate new application graphics or video frames to be displayed by the display unit. The GMN module 232 may also identify that a new control page may be needed to control, operate, and/or navigate the application from the smart remote controller 120. In such an instance, the GMN module 232 may send a new application information and a new control page ID to the transmitter module 236. The GMN module 232 may also detect that, while a new control page may not be needed, an update of a current control page may be necessary for proper control of the application on the media player given the current status of the application. In such an instance, the GMN module 232 may send an update key status event signal to the transmitter module 236.

At step 312 of the communication protocol 300, the transmitter module 236 may compose a new control page message when a new application and a new control page ID are received. The transmitter module 236 may compose a control page update message when the application and the control page ID received are the same as the previous application and the previous control page ID but an update key status event signal is also received. The transmitter module 236 may communicate the newly composed message to the receiver module 206 in the smart remote controller 120 via the wireless link 252.

At step 314 of the communication protocol 300, the control information received by the smart remote controller 120 may comprise links, such as uniform resource locators (URLs), for key icon images. In such instances, the receiver module 206 may need to obtain the complete graphical interface or control page information. Accordingly, the receiver module 206 may send to the transmitter module 204 a request, such as a GetPage request, for example, together with the application information and the control page ID of the control page update message received. The transmitter module 204 may compose a message that comprises a GetPage request and may send the message to the receiver module 234 in the media player controller 230 via the wireless link 250.

At step 316 of the communication protocol, the receiver module 234 passes the message and sends a GetPage command to the transmitter module 236, which in turn sends a complete new control page message to the receiver module 206 via the wireless link 252. The above-described step may be utilized when, for example, the smart remote controller 120 is unable to process partial control information such as when a control page update message is received.

The image cache module 210 in the smart remote controller 120 may store a limited number of recently utilized or retrieved images, such as key images, for example. The receiver module 206 may attempt to retrieve such images from the image cache module 210 using the URL or link associated with the key as an identifier. When the image is found in the image cache module 210, a request to obtain the image from the media player controller 230 may not be necessary, saving on the processing required by the smart remote controller 120 and/or the bandwidth between the smart remote controller 120 and the media player controller 230. When the image is not available in local cache, the receiver module 206 may begin the process of obtaining new images or icons from the media player controller 230. After some time of running or operating a particular application, it is likely that a complete set of images or icons is available in local cache and additional requests from the smart remote controller 120 may not be necessary.

Figure 4:
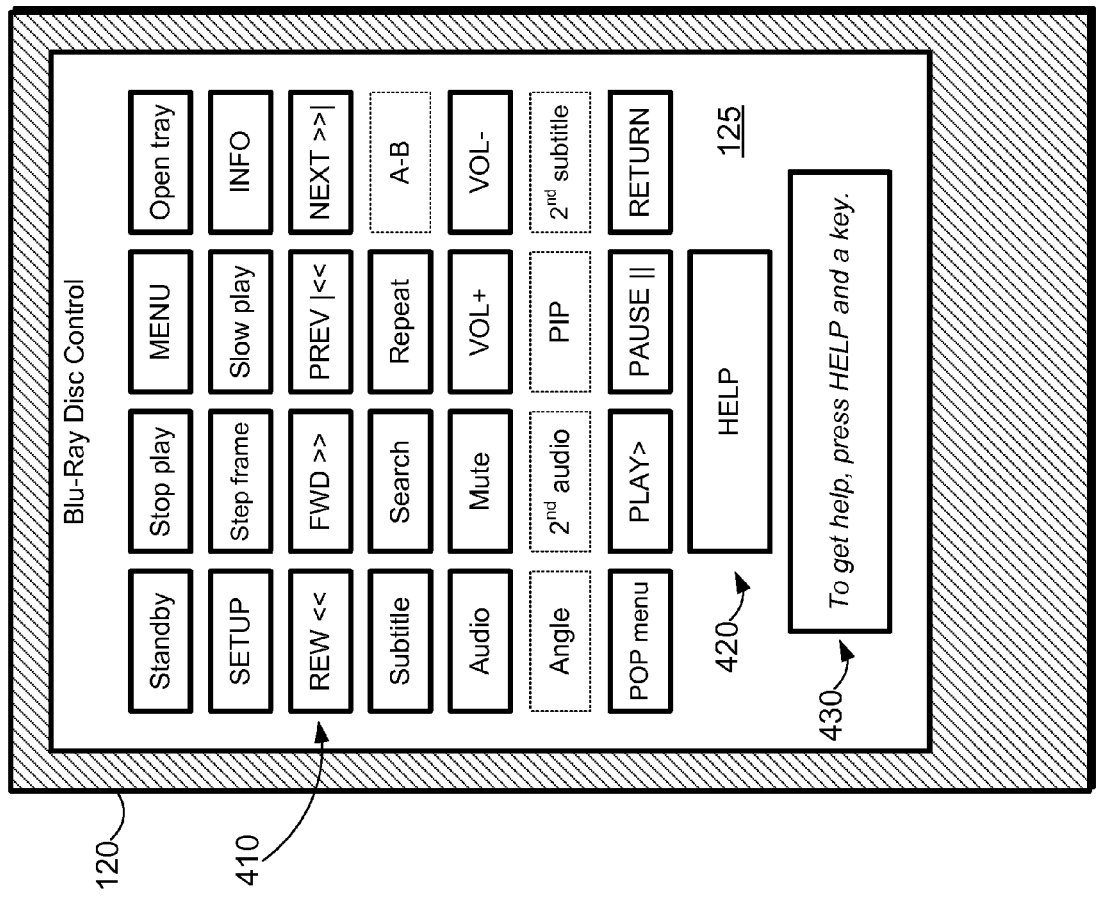
FIG. 4 is diagram illustrating an exemplary control page on a touch screen of a smart remote controller to operate a Blu-ray disc player, in accordance with an embodiment of the invention.

FIG. 4 is diagram illustrating an exemplary control page on a touch screen of a smart remote controller to operate a Blu-ray disc player, in accordance with an embodiment of the invention. Referring to FIG. 4, there is shown the smart remote controller 120 with the touch screen 125 displaying a control page that presents to a user the various operations that a user may perform with the smart remote controller 120 to control, operate, and/or navigate a Blu-ray disc player in connection with playing a Blu-ray disc. The layout of the control page may be configured based on the Blu-ray disc control application and its current status. Shown in this particular configuration of a control page are a plurality of keys arranged in an array 410, a HELP key 420 positioned below the array 410, and a text box 430 positioned below the HELP key 420. For each key in the array 410 there is an associated text that indicates the instruction or command that results from pressing that key.

In the configuration of the control page shown in FIG. 4, some of the keys in the array 410 are active and some are inactive. That is, while the control page displays a set of keys, not every key may be needed in the current operation of the Blu-ray disc control application. In this exemplary embodiment of the invention, active keys are illustrated with a heavy, solid-line border and inactive key are illustrated with a light, dashed-line border. For example, the MENU key in the top row in the array 410 is active while the PIP key in the next to bottom row in the array 410 is inactive.

The control page shown in FIG. 4 may be presented to a user after the smart remote controller 120 has awaken the Blu-ray disc player in a manner similar to that described above in the communication protocol 300 of FIG. 3. The Blu-ray disc player may have verified that the device ID of the smart remote controller 120 is valid and the smart remote controller 120 may be utilized to control, operate, and/or navigate the Blu-ray disc player.

Moreover, when providing capacity information to the Blu-ray disc player, the smart remote controller 120 may have indicated to the Blu-ray disc player that the smart remote controller 120 supports relative layout of keys on the touch screen 125 without the need to receive a control page message from the Blu-ray disc player comprising absolute position information. The use of relative layout in the smart remote controller 120 may allow, for example, different manufactures the flexibility of rendering control keys differently.

As described above, the control information that is provided to the smart remote controller 120 to configure and render the control page may be provided through a control page message. The control page message may be based on extensible markup language (XML) or other similar language, for example. Within a control page message, whether it is an XML-based message or otherwise, layout information regarding the various elements of the control page, such buttons, keys, virtual keyboards, text boxes, and/or touch pads, may be provided. For example, for the control page shown in FIG. 4, the layout information may comprise information about the array 410, including information about the individual keys in the array 410, the HELP key 420, and the text box 430.

In an embodiment of the invention, each of the elements in a control page may be associated with a particular group layout in the control page message. The member elements of a group layout may have a same weight attribute. The weight attribute may indicate a relative position in the control page for the elements of the group layout. In an embodiment of the invention, the higher weight for a particular group layout, the lower the position or location in which the elements of that group layout are to be displayed in the control page.

The control page message may also comprise an application ID number and a page ID number that uniquely identifies the control page. The control page message may also comprise a title of the control page to be displayed on the touch screen 125. In FIG. 4, for example, the title of the current page being displayed is "Blu-Ray Disc Control."

The control page message may provide various attributes for each key that is to be displayed on the touch screen 125 and that is included in a particular group layout. For example, in addition to a weight attribute, the attributes of each key in a group layout may comprise one or more of an identifier, an indication of whether the key is active, and help information associated with the key. The identifier may comprise an ID and the symbol, character, or text that is to be displayed in connection with the key. In an embodiment of the invention, when a user presses a particular key that is presented as part of the control page displayed on the touch screen 125, the key ID may be communicated from the transmitter module 204 in the smart remote controller 120 to the receiver module 234 in the media player controller 230. The key ID, just like the device ID for the smart remote controller 120, may be encrypted using a public encryption key when additional security may be warranted.

The attribute associated with whether a key in a particular group layout is active may be utilized to determine the manner in which to display the key on the touch screen 125 such that the user has a visual or graphical indication of the status of the key. By providing a different border, color, size, highlight, and/or other visual or graphical features, an active version of a key may be made distinguishable from an inactive version of the same key to the user.

The help or assistance attribute may be utilized to describe the function of the corresponding key when a user wants to obtain assistance about the key. To illustrate this feature, the control page shown in FIG. 4 has the HELP key 420 and the text box 430. The text box 430 may have available one or more rows of text to display user instructions or messages for a key in the array 410 when both the HELP key 420 and the key for which help is needed are pressed down.

In the case of the control page shown in FIG. 4, a control page message may provide various attributes for the group layout to which the text box 430 displayed on the touch screen 125 belongs. Such attributes may comprise one or more of a width, a height, and a value. The width attribute may describe the relative width of the text box 430 to the width of the touch screen 125. The height attribute may indicate a number of lines of text that are made available in the text box 430 to provide user instructions or messages. The value attribute may comprise the message to be displayed on the text box 430. For the text box 430, the value attribute is "To get help, press HELP and a key." The attribute value may be a meta command, that is, a feature that may define or describe additional commands or instructions that are agreed upon by between the smart remote controller 120 and the media player controller 230.

The attributes described above need not be exhaustive and other attributes and/or different combinations of attributes may be provided for a particular group layout associated with a control page message being provided to the smart remote controller 120.

In an embodiment of the invention, to configure the layout of the control page, the receiver module 206 in the smart remote controller 120 may utilize default sizes and/or default bit-map images for active or inactive keys that may be stored in the image memory module 208. The receiver module 206 may be utilized to calculate or determine the absolute positions for the various keys described in the control information provided in the control page message.

In another embodiment of the invention, the absolute position and the images, or links to images, for active and inactive keys may be calculated or determined by the transmitter module 236 in the media player controller 230. This calculation may be based on the ID information and the capacity information of the smart remote controller 120. In this manner, the Blu-ray disc player may have control over how to display each key on the touch screen 125 of the smart remote controller 120. The transmitter module 236 may then communicate the absolute position and the images, or link to images, for active and inactive keys to the smart remote controller 120 through a control page message.

To enable control of the look and feel of the control page to be displayed on the touch screen 125, the transmitter module 236 in the media player controller 230 may calculate additional layout attributes that may be provided through the control information comprised in a control page message. For example, a control page message may comprise additional layout attributes such as group x, group y, group width, group height, key x, key y, key width, key height, key icon, and key layout. The group x and the group y attributes may be utilized to indicate absolute horizontal and vertical coordinates, respectively, for the elements of a group layout, while the key x and the key y attributes may be utilized to indicate absolute horizontal and vertical coordinates for a particular key in a group layout. The group width and group height attributes may be utilized to indicate a size of the elements of a group layout, while the key width and the key height attributes may be utilized to indicate a size of a particular key in a group layout. The key icon attribute, for example, may be utilized to indicate a URL or other link for retrieving an icon corresponding to a key. These additional layout attributes are not exhaustive and other layout attributes and/or combination of layout attributes may be utilized.

The position control for the keys, virtual keyboards, text boxes, and/or touch pads displayed on the touch screen 125, may be shared between the smart remote controller 120 and the media player controller 230. For example, the media player controller 230 may specify the absolute positions for a particular group layout while specifying relative positions the various keys in that group layout. In such an instance, the keys may be horizontally centered in the group when the key layout attribute associated with that group layout has a value of "centerHorizontal" or vertically centered in the group when the key layout attribute associated with that group layout has a value of "centerVertical," for example.

Figure 5:
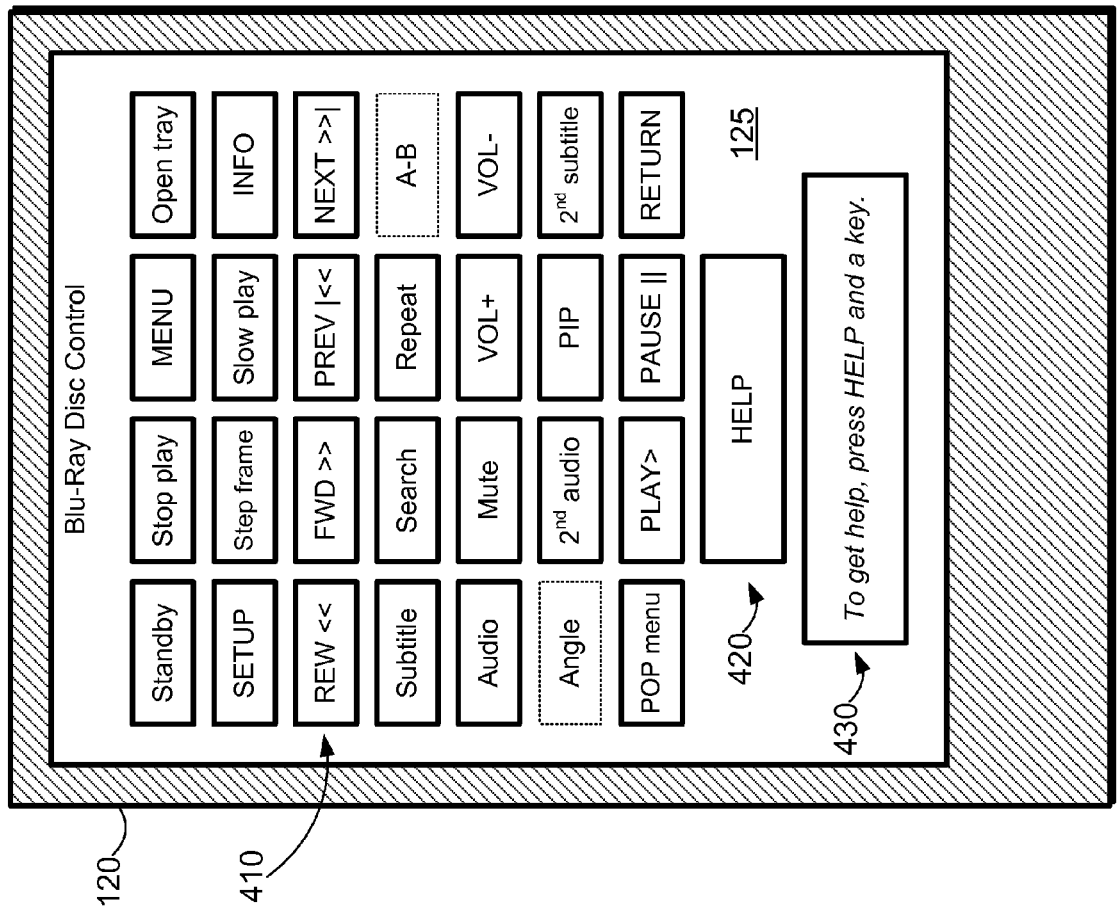
FIG. 5 is diagram illustrating an exemplary control page on a touch screen of a smart remote controller to operate a Blu-ray disc player when PIP is available, in accordance with an embodiment of the invention.

FIG. 5 is diagram illustrating an exemplary control page on a touch screen of a smart remote controller to operate a Blu-ray disc player when PIP is available, in accordance with an embodiment of the invention. Referring to FIG. 5, there is shown the smart remote controller 120 with the touch screen 125 displaying a control page. Shown in this particular configuration of the control page on the touch screen 125 are the array 410, the HELP key 420, and the text box 430 described above and shown in FIG. 4.

In the current configuration the control page that is shown in FIG. 5, picture-in-picture (PIP) operations are now available in the Blu-ray disc player and some of the keys in the array 410 that were shown as being inactive in FIG. 4 are now shown as being active in FIG. 5. For example, the $2^{nd}$ AUDIO key, the PIP key, and the $2^{nd}$ SUBTITLE key, all of which are on the next to bottom row in the array 410, are now shown as being active, that is, a user may press these active keys to send appropriate commands or instructions to the Blu-ray disc player. Such keys may become active when the media player, in this instance the Blu-ray disc player, detects that there are secondary video and audio streams for PIP operations. In such an instance, the GMN module 232 in the media player controller 230 may send a signal to the transmitter module 236 to indicate that PIP streams are available. The transmitter module 236 may send a control page update message to the receiver module 206 in the smart remote controller 120 indicating the status update, that is, the availability of PIP streams.

The control information in the control page update message may comprise the same application ID and same page ID as those of the currently displayed control page. When the receiver module 206 receives the control page update message, the receiver module 206 passes the information to update the current control page to the TSI module 202 to render the $2^{nd}$ AUDIO key, the PIP key, and the $2^{nd}$ SUBTITLE key with the appropriate graphical or visual features that indicate to a user that those keys are now active.

In another embodiment of the invention, when the SEARCH key in the array 410 shown in both FIGS. 4 and 5 is pressed, a user may be indicating that he/she wants to search for a particular TITLE/CHAPTER or for a particular TIME on a Blu-ray disc being played on the Blu-ray disc player. In such an instance, the TSI module 202 may send a signal to the transmitter module 204, which in turn composes or generates a command message that comprises the key ID for the SEARCH key. When warranted, the key ID may be encrypted using a public key of the Blu-ray disc player. Once the command message is composed, the command message may be communicated to the receiver module 234 in the media player controller 230 via the wireless link 250. The receiver module 234 may decrypt the encrypted key ID in the command message when necessary. The receiver module 234 may then send a signal to the GMN module 232 to indicate that the SEARCH key in the smart remote controller 120 has been pressed. The GMN module 232 may detect that a Blu-ray disc is currently playing on the Blu-ray disc player and may send a new control page signal to the transmitter module 236. The transmitter module 236 may compose a new control page message and may communicate the new control page message to the receiver module 206 in the smart remote controller 120 via the wireless link 252. The new control page message may provide control information to display a different control page on the touch screen 125 that may allow a user to input a desired destination TITLE/CHAPTER or TIME in the Blu-ray disc.

The receiver module 206 may detect that the new control page message provided by the media player controller 230 comprises a different page ID from a current page ID. The receiver module 206 may pass the control information in the new control page message, may calculate the layout information associated with the new control page, and may send one or more signals to the TSI module 202 to render the new control page for display on the touch screen 125. An example of a control page having an input search location configuration is shown in FIG. 6 and is described below.

Figure 6:
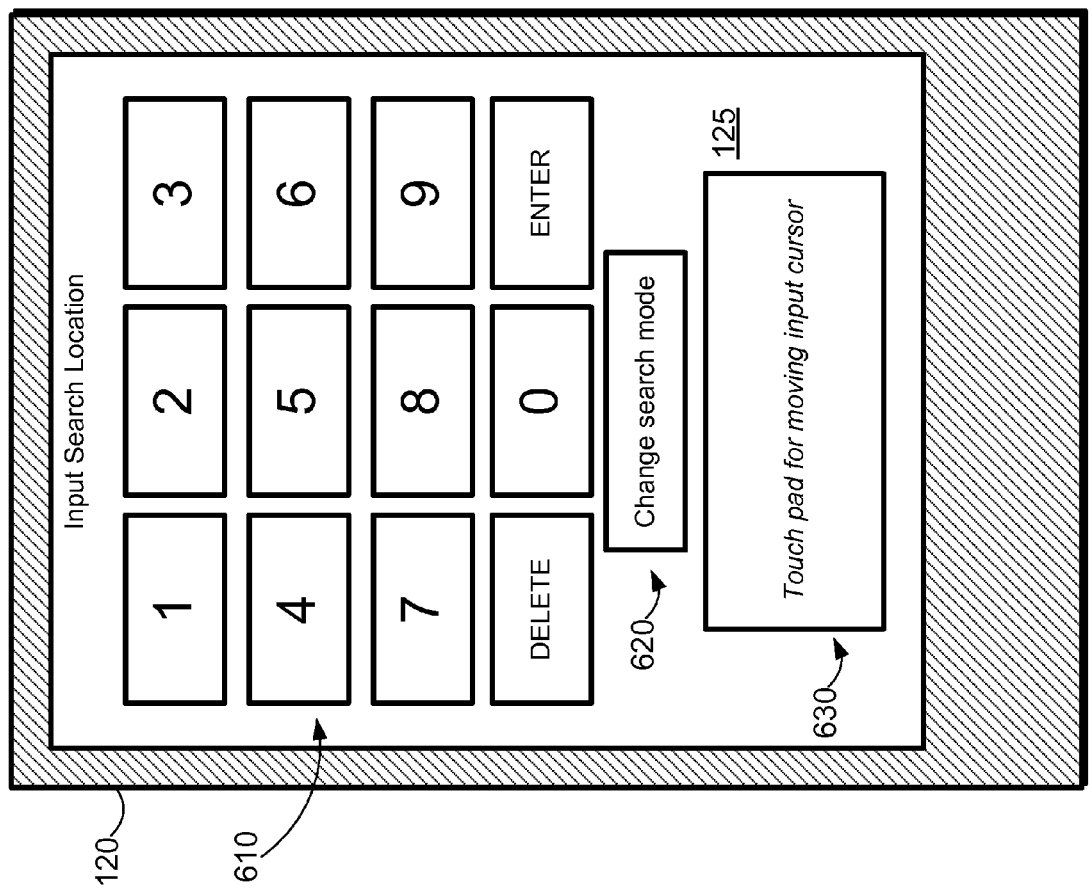
FIG. 6 is diagram illustrating an exemplary control page on a touch screen of a smart remote controller for providing input search locations to a Blu-ray disc player, in accordance with an embodiment of the invention.

FIG. 6 is diagram illustrating an exemplary control page on a touch screen of a smart remote controller for providing input search locations to a Blu-ray disc player, in accordance with an embodiment of the invention. Referring to FIG. 6, there is shown the smart remote controller 120 with the touch screen 125 displaying a control page that enables a user to input a search location to a particular destination TITLE/CHAPTER or TIME in the Blu-ray disc. Shown in this particular configuration the control page on the touch screen 125 are an plurality of keys in an array 610, a CHANGE SEARCH MODE key 620, and a touch pad 630. The keys in the array 610 allow a user to select a particular TITLE/CHAPTER or TIME in the Blu-ray disc. The CHANGE SEARCH MODE key 620 allows a user to toggle between searching by TITLE/CHAPTER and searching by TIME. The touch pad 630 enables a user to move an input cursor. With respect to the touch pad 630, the new control page message received by the receiver module 206 may include layout attributes for the touch pad 630 such as title of the touch pad and a relative size.

Figure 7:
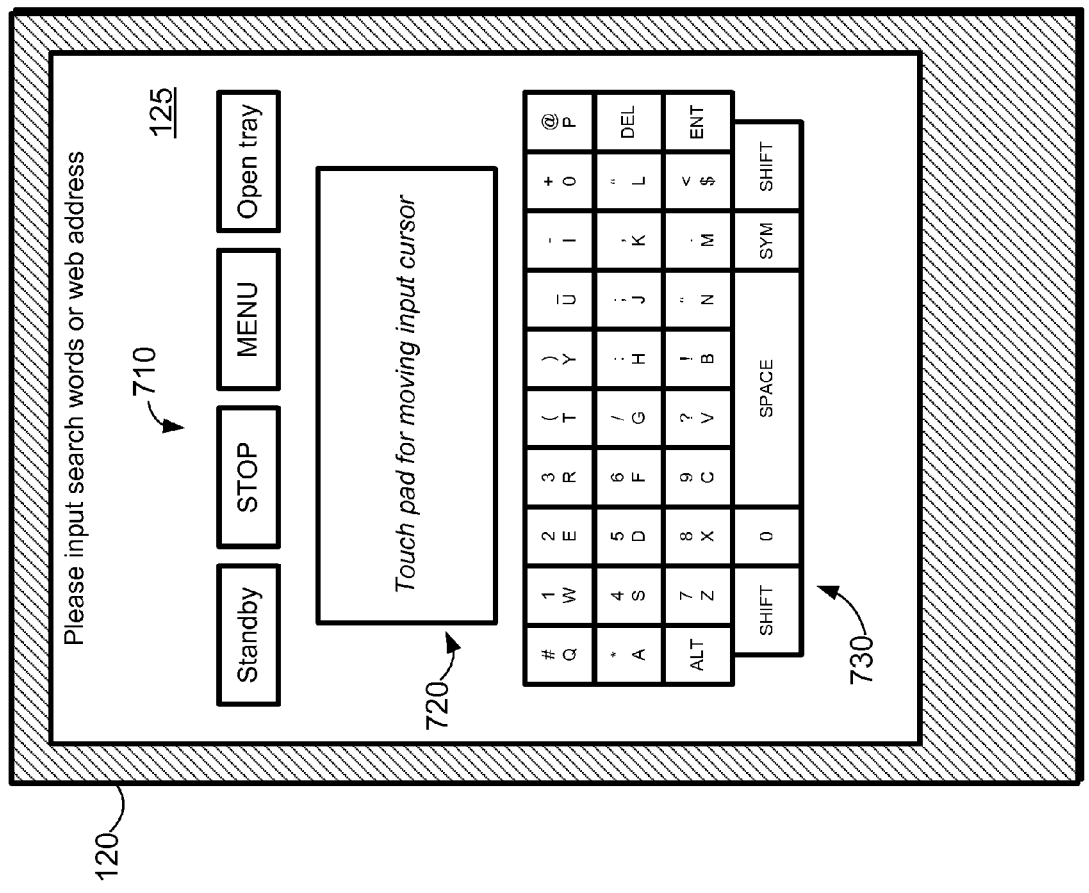
FIG. 7 is diagram illustrating an exemplary control page on a touch screen of a smart remote controller for providing input search words or web addresses to a media player, in accordance with an embodiment of the invention.

FIG. 7 is diagram illustrating an exemplary control page on a touch screen of a smart remote controller for providing input search words or web addresses to a media player, in accordance with an embodiment of the invention. Referring to FIG. 7, there is shown the smart remote controller 120 with the touch screen 125 displaying a control page that may be utilized by a user to input search words or web address in connection with search capabilities and/or Internet navigation. In this instance, the media player controlled by the smart remote controller 120 may be a Blu-ray disc player or other type of media player. Shown in this particular configuration of the exemplary control page are a plurality of keys arranged in a linear array 710, a touch pad 720 positioned below the linear array 710, and a virtual keyboard 730 positioned below the touch pad 720. The linear array 710 may comprise a STANDBY key, a STOP key, a MENU key, and an OPEN TRAY key. The touch pad 720 may be utilized by the user to, for example, move a cursor on a display unit communicatively coupled to the media player being controlled by the smart remote controller 120. With respect to the virtual keyboard 730, when a control page message associated with the control page shown in FIG. 7 received by the smart remote controller 120 comprises a group layout with a virtual keyboard, the image memory module 208 in the smart remote controller 120 may have stored support information for a virtual keyboard such that the transmitter module 236 in the media player controller 230 need not specify each of the keys in the virtual keyboard.

Figure 8:
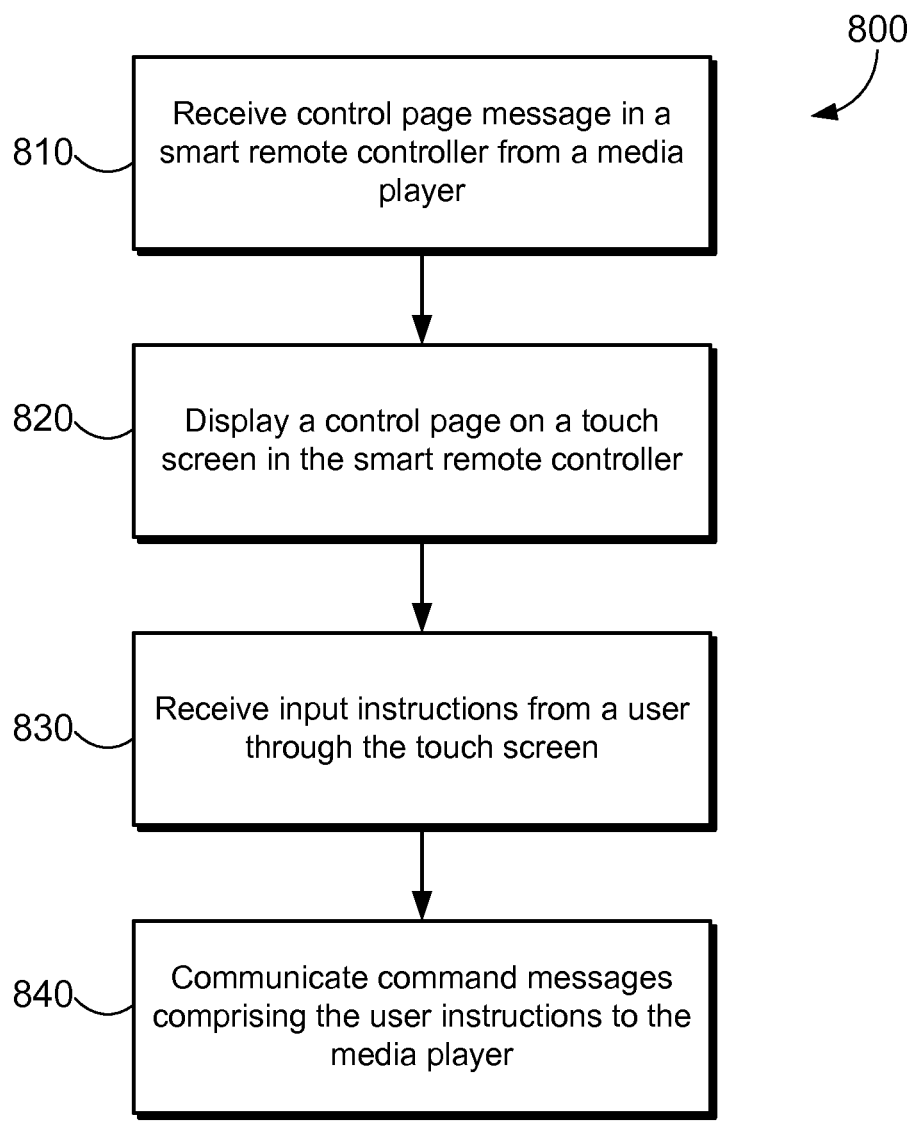
FIG. 8 is a flow chart illustrating exemplary steps in an adaptive, two-way feedback control scheme utilized by a smart remote controller, in accordance with an embodiment of the invention.

FIG. 8 is a flow chart illustrating exemplary steps in an adaptive, two-way feedback control scheme utilized by a smart remote controller, in accordance with an embodiment of the invention. Referring to FIG. 8, there is shown a flow chart 800 in which, at step 810, a smart remote controller, such as the smart remote controller 120 described above, may receive a control page message from a media player. The media player may be a set-top-box, a DVR, a DVD player, a Blu-ray disc player, or the like. In some instances, the media player may be integrated with a display unit. The media player may comprise a controller, such as the media player controller 230 described above, which may be operable to generate the control page message received by the smart remote controller. The smart remote controller and the media player may communicate via bi-directional wireless connection such as a Bluetooth or WiFi connection, for example.

At step 820, the smart remote controller may utilize the control information comprised within the control page message and/or additional information stored in the smart remote controller, to generate image information that may be rendered to produce a control page to be displayed on a touch screen in the smart remote controller. The control page may present the user with keys, virtual keyboards, text boxes, and/or touch pads to enable the user to control an application in the media player in accordance with a current status of that application.

At step 830, once the control page is displayed, a user may interact with the graphical interface provided by the control page to select instructions or commands for controlling the operation of the media player. The user may input those instructions or commands through the touch screen. The smart remote controller may identify the instructions or commands provided by the user based on signals generated by the touch screen.

At step 840, the smart remote controller may compose and communicate command messages comprising the user instructions to the media player via the wireless connection. The media player may utilize the instructions received to change the graphics or video being displayed on a display unit communicatively coupled to the media player. In some instances, the media player may send new control page messages or control page update messages to the smart remote controller when a new control page needs to be displayed on the touch screen of the smart remote controller or when a current control page needs to be updated on the touch screen of the smart remote controller, respectively.

In an embodiment of the invention, a wireless controller, such as the remote controller 120 described above, may receive one or more signals from a media player, such as the media player 110 described above with respect to FIG. 1. The one or more signals may be received by the receiver module 206 in the smart remote controller 120. The one or more signals received may comprise control information associated with an application on the media player 110. The smart remote controller 120 may display, through the TSI module 202, a control page on the touch screen 125. The display may be based on a rendering of the control page by the TSI module 202, wherein the rendering is based on the control information received and on stored image information.

A layout of the control page to be displayed may be configured by the receiver module 206 and/or the TSI module 202 based on the control information received by the smart remote controller 120. The layout of the control page may comprise one or more key images, text box images, virtual keyboard images, and/or touch pad images. The control page, once displayed, enables a user to provide one or more instructions to the smart remote controller 120 through the touch screen 125. The transmitter module 204 in the smart remote controller 120 may communicate to the media player 110 the instructions provided by the user to the smart remote controller 120. By communicating those instructions to the media player 110, a user may remotely control the operation of the application on the media player 110.

The smart remote controller 120 may receive one or more additional signals from the media player 110. The additional signal may comprise new control information associated with a status change in the application on the media player 110. The smart remote controller 120 may modify the layout of the control page based on the new control information received. Once the layout is modified, the wireless controller may display, through the TSI module 202, the control page on the touch screen 125. The modification may comprise changing one or more visual features of a particular key in the layout of the control page, wherein the changed visual features indicate that the particular key is an active key.

The smart remote controller 120 may determine one or more of a position, a size, and an icon for one or more images associated with the layout of the control page. Moreover, the control information received by the smart remote controller 120 may comprise one or more of a position, a size, and an icon determined by the media player 110 for one or more images associated with the layout of the control page.

The smart remote controller 120 may receive the one or more signals comprising control information from the media player 110 through a determined communication protocol. Similarly, the smart remote controller 120 may communicate, to the media player 120, the instructions provided to the smart remote controller 120 through the touch screen 125 utilizing the same communication protocol. The smart remote controller 120 may communicate to the media player 110 information about the smart remote controller 120, including identification information and/or capacity information. The control information received by the smart remote controller 120 from the media player 110 may be based on information provided about the smart remote controller 120.

The smart remote controller 120 may receive one or more additional signals from the media player 110. The one or more additional signals may be received by the receiver module 206 and may comprise new control information responsive to an instruction received by the media player 110 from the smart remote controller 120. The smart remote controller 120 may display, through the TSI module 202, a new control page on the touch screen 125. The new control page may be different from a previous control page. A layout of the new control page may be configured based on the new control information received by the smart remote controller 120. The new control page may enable a user to provide to the smart remote controller 120, through the touch screen 125, instructions that are different from the instructions enabled by the previous control page.

In another embodiment of the invention, a wireless controller, such as the remote controller 120, may receive one or more signals from a media player, such as the media player 110. The one or more signals received may comprise control information associated with control of one or more functions of the media player 110. The smart remote controller 120 may configure a layout of a user interface, such as a control page, that is presented on smart remote controller 120 based on the received control information. The smart remote controller 120 may control operation of the media player 110 based on input received via the configured layout of the user interface. The smart remote controller 120 may reconfigure the layout of the user interface based on or more new signals received from the media player 110, the received input, and/or one or more new inputs received via the user interface. Moreover, the smart remote controller 120 may update the user interface based on or more new signals received from the media player 110, the received input, and/or one or more new inputs received via the user interface.

Another embodiment of the invention may provide a non-transitory machine and/or computer readable storage and/or medium, having stored thereon, a machine code and/or a computer program having at least one code section executable by a machine and/or a computer, thereby causing the machine and/or computer to perform the steps as described herein for interactive control of media players.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
in a wireless controller comprising a touch screen:
transmitting identification information and capacity information including a display area of the touch screen of the wireless controller to a transmitter module of a media player for verification that the wireless controller is a valid control device based on the identification information;
receiving, from the media player, a control description associated with the identification information that describes a configuration of a layout of a user interface control associated with a function of the media player, comprising layout attributes specifying horizontal and vertical coordinates and key width and height of individual keys for the user interface control within the layout, adapted by the media player to fit the display area of the touch screen of the wireless controller via calculated templates for different control pages for applications supported by the media player;
generating a user interface based on the received control description;
presenting the user interface on the wireless controller; and
controlling operation of the media player based on input received via the user interface.

2. The method of claim 1, comprising regenerating the user interface based on another control description received from the media player, the received input, another input received via the user interface, or combinations thereof.

3. The method of claim 1, comprising updating the user interface based on another control description received from the media player, the received input, another input received via the user interface, or combinations thereof.

4. The method of claim 1, comprising modifying one or more visual features of a key included in the user interface, the modified visual features indicating a status of the key as active.

5. The method of claim 1, wherein the user interface comprises one or more of:
one or more key images;
one or more virtual keyboard images;
one or more text box images; and
one or more touch pad images.

6. The method of claim 1, comprising determining one or more of a position, a size, and an icon for one or more images associated with the layout of the user interface.

7. The method of claim 1, wherein the control description received by the wireless controller further comprises an icon determined by the media player for each of one or more images associated with the user interface.

8. The method of claim 1, comprising:
receiving from the media player, through a determined communication protocol, the control description; and
communicating to the media player, through the determined communication protocol, at least one instruction associated with the input received via the generated-user interface.

9. The method of claim 1, comprising:
receiving from the media player, one or more images associated with the layout of the user interface; and
configuring the layout of the user interface that is presented on the wireless controller based on the received one or more images.

10. A system, comprising:
one or more processors or circuits for use in a wireless controller including a touch screen, the one or more processors or circuits being operable to:
transmit identification information and capacity information including a display area of the touch screen of the wireless controller to a transmitter module of a media player for verification that the wireless controller is a valid control device based on the identification information;
receive, from the media player, a control description associated with the identification information that describes a configuration of a layout of a user interface control associated with a function of the media player, comprising layout attributes specifying horizontal and vertical coordinates and key width and height of individual keys for the user interface control within the layout adapted by the media player to fit the display area of the touch screen of the wireless controller via calculated templates for different control pages for applications supported by the media player;
generate a user interface based on the received control description;
present the user interface on the wireless controller; and
control operation of the media player based on input received via the user interface.

11. The system of claim 10, wherein the one or more processors or circuits are operable to update the user interface based on another control description received from the media player, the received input, another input received via the user interface, or combinations thereof.

12. The system of claim 10, wherein the one or more processors or circuits are operable to modify one or more visual features of a key in the user interface, the modified visual features indicating a status of the key as active.

13. The system of claim 10, wherein the user interface comprises one or more of:
one or more key images;
one or more virtual keyboard images;
one or more text box images; and
one or more touch pad images.

14. The system of claim 10, wherein the control information received by the wireless controller comprises an icon determined by the media player for each of one or more images associated with the user interface.

15. The system of claim 10, wherein the one or more processors or circuits are operable to:
receive from the media player, one or more images associated with the user interface; and
configure the user interface that is presented on the wireless controller based on the received one or more images.

16. A method, comprising:
in a wireless controller comprising a touch screen:
transmitting identification information and capacity information including a display area of the touch screen of the wireless controller to a transmitter module of a media player for verification that the wireless controller is a valid control device based on the identification information;
receiving, from the media player, a control description associated with the identification information that describes a configuration of a layout of a user interface control associated with a function of the media player, comprising layout attributes specifying horizontal and vertical coordinates and key width and height of individual keys for the user interface control within the layout, adapted by the media player to fit the display area of the touch screen of the wireless controller via calculated templates for different control pages for applications supported by the media player;

configure an arrangement of a user interface to include the user interface control that corresponds to the control description;

presenting the user interface on the wireless controller; and controlling operation of the media player based on input received via the user interface.

17. The method of claim 1, further comprising transmitting capacity information of the wireless controller including a color depth of the touch screen, an indication of whether the touchscreen is operable to control a cursor position, or an indication of whether the touchscreen is operable as a virtual keyboard to the media player.

18. The method of claim 1, further comprising transmitting capacity information of the wireless controller including an indication of whether the wireless controller supports a relative key layout to the media player.

19. The method of claim 1, further comprising:

receiving, from the media player, a second control description describing a configuration of a second layout of the user interface control;

generating a second user interface based on the received second control description; and presenting the second user interface on the wireless controller.

20. The method of claim 19, further comprising:

receiving, from the media player, a notification to request a new control description; and transmitting a request for the new control description responsive to receiving the notification; and wherein the second control description is transmitted by the media player responsive to the request for the new control description.

* * * * *